United States Patent
Gundur et al.

(10) Patent No.: US 11,792,609 B2
(45) Date of Patent: Oct. 17, 2023

(54) METHOD AND APPARATUS FOR AD-HOC COMMUNICATION IN MISSION CRITICAL SYSTEMS (MCX)

(71) Applicant: Samsung Electronics Co., Ltd., Suwon-si (KR)

(72) Inventors: Siva Prasad Gundur, Bangalore (IN); Vengataraaman Ramamoorthy, Bangalore (IN); Karthik Narayanan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 17/250,956

(22) PCT Filed: Oct. 16, 2019

(86) PCT No.: PCT/KR2019/013599
§ 371 (c)(1),
(2) Date: Apr. 1, 2021

(87) PCT Pub. No.: WO2020/080828
PCT Pub. Date: Apr. 23, 2020

(65) Prior Publication Data
US 2021/0392468 A1    Dec. 16, 2021

(30) Foreign Application Priority Data

Oct. 16, 2018  (IN) .............................. 201811039263
Oct. 15, 2019  (IN) .............................. 201811039263

(51) Int. Cl.
*H04W 4/00*  (2018.01)
*H04W 4/08*  (2009.01)
(Continued)

(52) U.S. Cl.
CPC ............... *H04W 4/08* (2013.01); *H04W 4/90* (2018.02); *H04W 12/037* (2021.01);
(Continued)

(58) Field of Classification Search
CPC ......... H04W 4/08; H04W 4/90; H04W 84/18; H04W 12/041; H04W 12/0431; H04W 12/037
See application file for complete search history.

(56) References Cited

U.S. PATENT DOCUMENTS

| | | | |
|---|---|---|---|
| 2011/0143757 A1* | 6/2011 | Oh ......................... | H04W 4/08 455/435.2 |
| 2012/0198226 A1 | 8/2012 | Wimmer | |
| 2014/0044263 A1* | 2/2014 | King ................... | H04W 12/033 380/270 |

FOREIGN PATENT DOCUMENTS

WO    2018083327 A1    5/2018

OTHER PUBLICATIONS

ETSI TS 123 379 V15.5.0 (Oct. 2018), LTE; Functional architecture and information flows to support Mission Critical Push To Talk (MCPTT); Stage 2 (3GPP TS 23.379 version 15.5.0 Release 15), Oct. 2018, 198 pages.

(Continued)

*Primary Examiner* — Omoniyi Obayanju (57) ABSTRACT

According to an embodiment of the present disclosure, a method of key-management by a group management server in Mission Critical Systems (MCX) between an initiating party and a receiving party is provided. The method comprises generating a master key, the master key being designated for an ad-hoc communication, allocating an identifier to the generated master key, and transmitting a transmission message signed by an initiating MCX entity including the master key to a receiving MCX entity.

10 Claims, 10 Drawing Sheets

(51) Int. Cl.
*H04W 4/90* (2018.01)
*H04W 12/037* (2021.01)
*H04W 12/0431* (2021.01)
*H04W 12/041* (2021.01)
*H04W 84/18* (2009.01)

(52) U.S. Cl.
CPC ..... *H04W 12/041* (2021.01); *H04W 12/0431* (2021.01); *H04W 84/18* (2013.01)

(56) References Cited

OTHER PUBLICATIONS

ETSI TS 133 179 V13.7.0 (Oct. 2018), LTE; Security of Mission Critical Push To Talk (MCPTT) over LTE (3GPP TS 33.179 version 13.7.0 Release 13), Oct. 2018, 92 pages.

ETSI TS 133 180 V15.3.0 (Oct. 2018), LTE; Security of the mission critical service (3GPP TS 33.180 version 15.3.0 Release 15) Oct. 2018, 196 pages.

International Search Report and Written Opinion of the International Searching Authority in connection to International Application No. PCT/KR2019/013599 dated Jan. 21, 2020, 4 pages.

Examination report dated Jan. 31, 2021 in connection with Indian Application No. 201811039263, 6 pages.

3GPP TS 33.179 V13.7.0 (Sep. 2018), Technical Specification, 3rd Generation Partnership Project; Technical Specification Group Services and System Aspects; Security of Mission Critical Push To Talk (MCPTT) over LTE (Release 13), Sep. 2018, 91 pages.

ETSI TS 133 180 V15.2.0 (Jul. 2018), Technical Specification, LTE; Security of the mission critical service (3GPP TS 33.180 version 15.2.0 Release 15), Jul. 2018, 195 pages.

* cited by examiner

METHOD AND APPARATUS FOR AD-HOC COMMUNICATION IN MISSION CRITICAL SYSTEMS (MCX)

CROSS-REFERENCE TO RELATED APPLICATIONS

This application is a 371 National Stage of International Application No. PCT/KR2019/013599 filed Oct. 16, 2019, which claims priority to Indian Provisional Patent Application No. 201811039263 filed Oct. 16, 2018, and Indian Non-Provisional Patent Application No. 201811039263 filed Oct. 15, 2019, the disclosures of which are herein incorporated by reference in their entirety.

BACKGROUND

1. Field

The present disclosure relates to mission critical services and in particular, relates to secure communication in mission critical services.

2. Description of Related Art

With the continuous growth and development in the telecommunication industry, multi-user conference calls have become quite popular nowadays. Such calls usually involve a number of participants communicating among themselves. In an example, such conference based communication is used in case of Mission Critical Services as well. As is generally known, services that are so critical to an operation that any disruption or failure may altogether disrupt the concerned operation are known as Mission Critical Services. Such services are relevant, especially for agencies providing Public Safety services such as, Police services, Fire services, and Ambulance services. Therefore, in order to cater to emergency situations as generally experienced by the Public Safety services, the mission critical services are to be rendered with high reachability, availability, reliability, and Quality of Service.

Ensuring secure communication is one of the prominent requirements in the realm of mission critical services. For example, communication in the mission critical services may be secured using a Secure Real-Time Transport Protocol (SRTP) encryption technique. SRTP is a known protocol for encryption of voice packets. However, existing techniques in the mission critical services do not provide Adhoc-communication, for example, conference calls in VoLTE. In an example, the existing techniques do not support sharing of keys for the SRTP encryption to establish the Adhoc communication. In an example, Mikey-Sakke technique is a techniques used in the field of mission critical services for securely transferring keys to be used for the SRTP encryption in group calls through a message. Yet, there does not exist any technique to achieve the same for facilitating Adhoc communication.

Overall, the contemporary telecommunication standards pertaining to 3rd Generation Partnership Project (3GPP) (e.g. 3gpp 24.481, 33.180 MCX Specs) do not provide a secure way of exchanging the keys to realise the secure communication for the adhoc group communications, unlike the pre-arranged group communications where the groups and the keys are created beforehand.

Figure 1A:
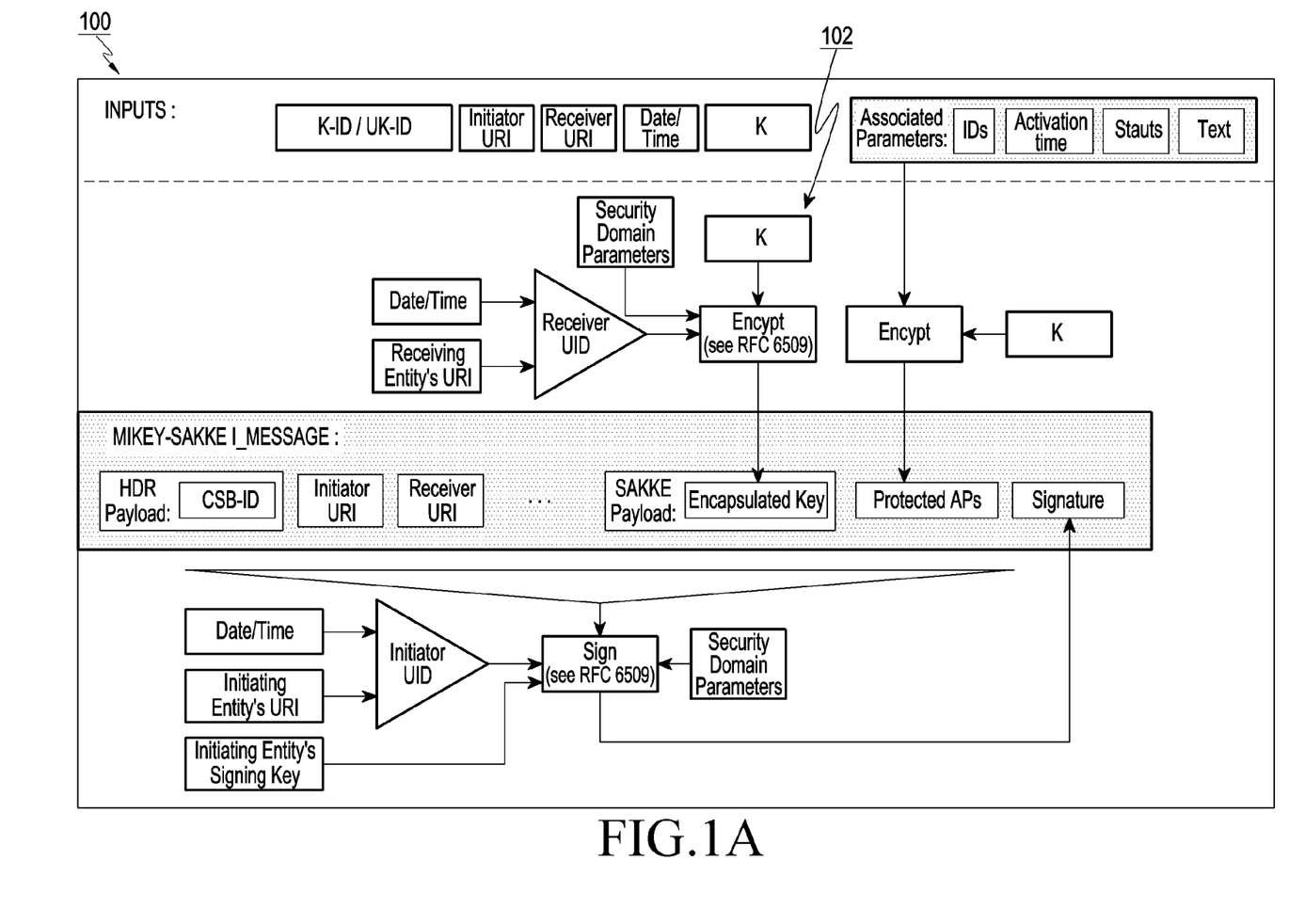
FIGS. 1A and 1B illustrates a state of the art environment depicting generation of Group Management Keys (GMK) for establishing communication in Mission Critical Services.

FIG. 1A illustrates an environment 100 depicting generation of Group Management Keys (GMK) 102 for establishing communication in Mission Critical Services (MCS), according to the specifications defined by 3gpp 33.180 V14.3.0. A Group Management Key (GMK) 102 is associated with a group. Therefore, for each group, a GMK 102 may be generated. Further, the GMK 102 may be received at a User Equipment (UE) through a group Session Initiation Protocol (SIP). The GMKs 102 are distributed based on encryption performed by using credentials, for example, Mission Critical Credentials, of a user. The credentials of the user may include, but are not limited to, a Mission Critical Identification (MC-ID) and details of a corresponding key.

The environment 100 may include a Group Management Server (GMS) to generate the user-credentials and the GMK. Based on the user credentials, the GMS may distribute the GMK 102 to group members. As may be understood, the SRTP uses encryption key (K) to encrypt the RTP packets. The key K, has to be distributed to call participants using the MIKEY-SAKKE I_MESSAGE (Initiator's Message), where the key is encrypted specifically to the receiving entity (IDRr) and signed by the initiating entity (IDRi) (i.e. GMS).

Figure 1B:
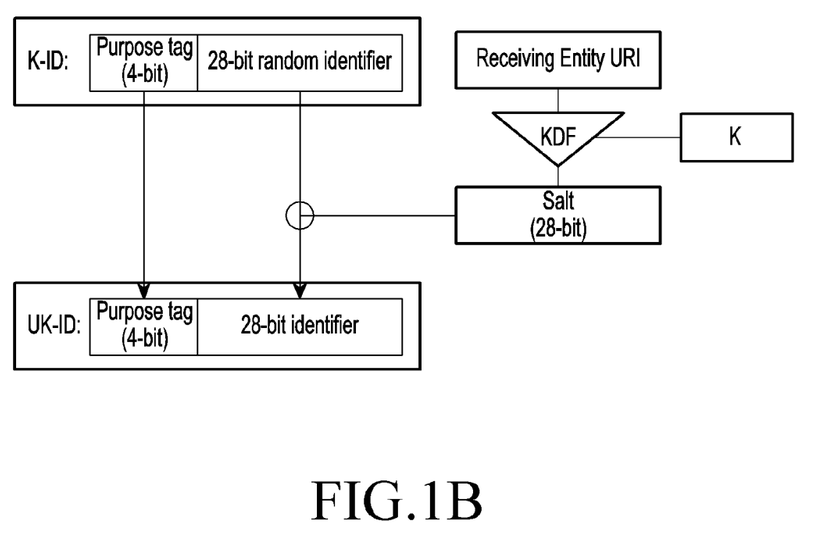

As indicated in FIG. 1B, a Key Identity (K-ID)'s first 4 most significant bits is the 'purpose tag' which defines the purpose of the key. The 28 least significant bits of the K-ID is a 28-bit randomly-generated value. The key 102 is distributed with an end-point-specific key identity UK-ID derived from key id K-ID. This allows the receiving entity of the key distribution to diversify the shared key for end-point-specific use. Specific types of key require use of end-point key diversity. The type of key is defined by the 'purpose tag' within the key identifier stored in the CSB-ID field of the MIKEY payload.

SUMMARY

In case of the communication being an Mission Critical System (MCX) Adhoc Call, the groups are not pre-defined so the GKTPs are not created for Adhoc Group Call. Therefore, generation and distribution of GMK remains non-feasible for ad hoc communication.

Furthermore, Private Call Keys (PCK) are also not Feasible for ad-hoc communication purposes since the same will entail encryption of I-MESSAGE with respect to each user of an adhoc call. Therefore, generation of PCKs to encrypt all the I-MESSAGEs remains inconvenient in terms of handling and storing the data so generated. In other words, encrypting keys for all users of the adhoc-communication by the originator remains time-consuming and inconvenient.

Accordingly, there remains a long-felt need of a secured Adhoc communication. Specifically, there remains a need of enabling Ad-hoc communication in the MCX system.

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

According to an embodiment of the present disclosure, a method of key-management by a group management server in Mission Critical Systems (MCX) between an initiating party and a receiving party comprises generating a master key, the master key being designated for an ad-hoc communication, allocating an identifier to the generated master key, and transmitting a transmission message signed by an initiating MCX entity including the master key to a receiving MCX entity.

According to another embodiment of the present disclosure, a method for supporting adhoc-communication by an application server in Mission Critical Systems (MCX) comprises receiving, from a first user equipment (UE), a first ad-hoc communication invitation message signed by the first UE and including a master-key designated for ad-hoc communication by the first UE, generating a second ad-hoc communication invitation message signed by the application server and including the master key, and transmitting the generated second ad-hoc communication invitation message to a second UE, wherein the adhoc-communication between the first UE and the second UE is established based on the second ad-hoc communication invitation-message.

According to another embodiment of the present disclosure, a method for supporting ad-hoc communication by an application server in Mission Critical Systems (MCX), comprises generating a master-key for ad-hoc communication by the application server based on a trigger received from a first UE, transmitting a first ad-hoc communication invitation message signed by the application server and including the master key to the first UE, and transmitting a second ad-hoc communication invitation message signed by the application server and including the master key to a second UE, wherein ad-hoc communication among UEs including the first UE and the second UE is established based on the first and the second message.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings.

Unless otherwise defined, all technical and scientific terms used herein have the same meaning as commonly understood by one of ordinary skilled in the art to which this invention belongs. The system, methods, and examples provided herein are illustrative only and not intended to be limiting.

Aspects of the present subject matter relate to systems and methods to establish Adhoc calls for communication in Mission Critical Services (MCS). Embodiments of the present invention are described below in detail with reference to the accompanying drawings.

The present disclosure provides systems and methods of establishing secure Adhoc communication for communication in MCS. The present subject matter discloses a technique for sharing and using keys for establishing the Adhoc communication. In particular, the techniques allow for sharing of keys to initiate generation of Secure Real-Time Transport Protocol (SRTP), secure Message Session Relay Protocol (secure MSRP) keys for establishing the Adhoc calls. Further, the systems and the methods are applicable to Mission Critical Push-To-Talk (MCPTT) as well as Mission Critical Adhoc video calls and Mission Critical Adhoc Data calls/chats. Mission Critical Video, also referred to as MCVideo, is one of the services used for Mission Critical audio-video communication. Mission Critical Data, also referred to as MCData, is one of the services used for Mission Critical Message communications like chat, file transfer, etc.

Figure 2A:
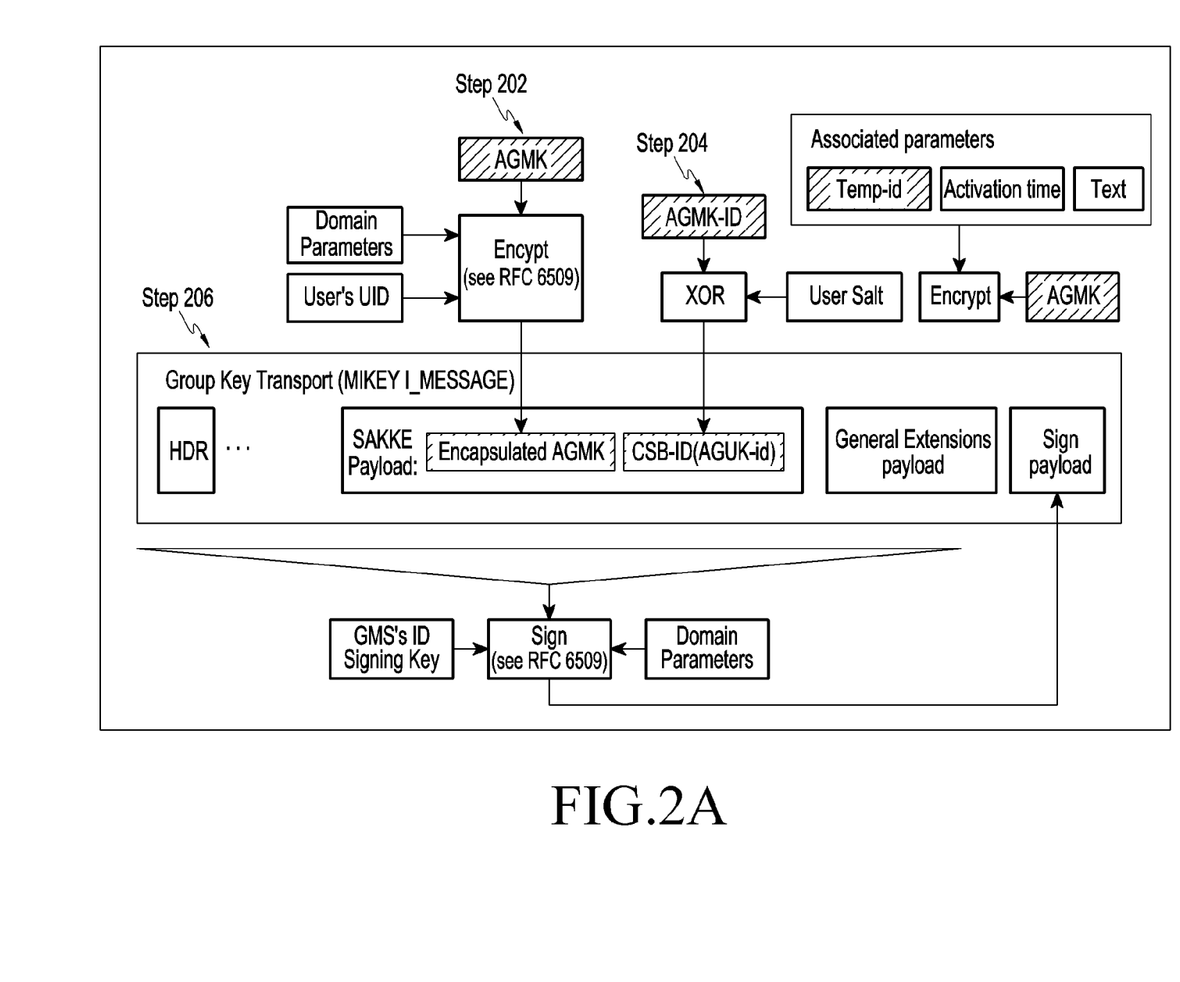
FIGS. 2A, 2B and 2C illustrates a method for secure adhoc communication in Mission Critical Services (MCS), according to an embodiment of the present disclosure.
Figure 2B:
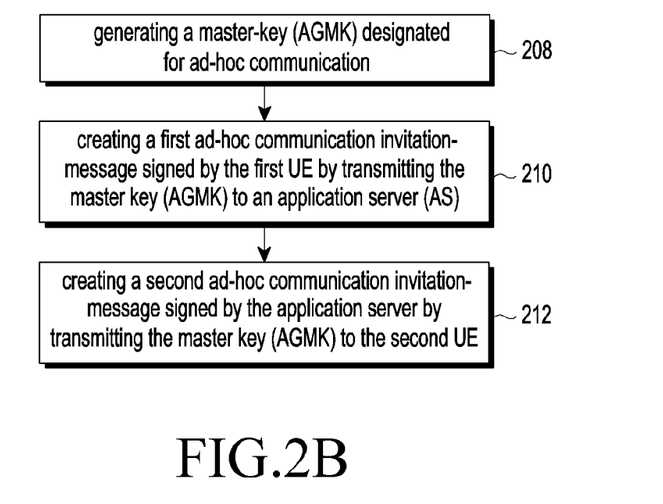
Figure 2C:
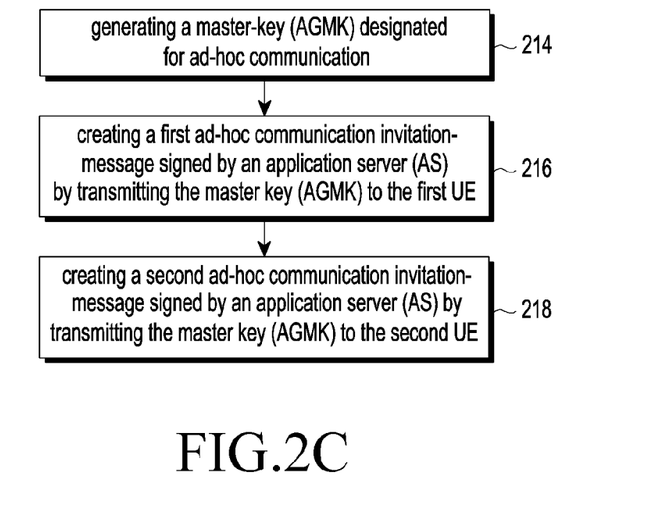

FIG. 2 (*a* to *c*) illustrates a method for secure adhoc communication in Mission Critical Services (MCS), according to an embodiment of the present disclosure.

FIG. 2A depicts the method of key-management in Mission Critical Systems (MCX) between an initiating party and a receiving party. The method comprises generating (step 202) a master-key (AGMK) by a group management server (GMS). The master-key is designated for ad-hoc communication. Further, an identifier (AGMK-ID) is allocated (step 204) to the master-key. The identifier (AGMK-ID) comprises a plurality of bits identifying AGMK for the ad-hoc communication, and a random-number.

Further, the method comprises creating (step 206) a transmission-message signed by an initiating MCX entity for transmitting the master key (AGMK) to a receiving MCX entity. The message comprises a main-payload defined by an encapsulated key defined by encryption of the ad hoc master-key (AGMK) by a user-identity (UID) related to the receiving MCX entity. An ad-hoc user-key identifier (AGUK-ID) defines an end-point-specific key identity derived from the allocated identifier (AGMK-ID). In an example, the message comprising the payload is a MIKEY-SAKKE I_MESSAGE defined in IETF RFC 6509 and communicated by the group management server (GMS) to the receiving MCX entity.

Further, the method comprises sending by a first user equipment (UE1) an adhoc-communication invitation to a second user equipment (UE2) based on the master key (AGMK) or a key-identifier (key-ID) identifying the master-key (AGMK) from amongst a plurality of master-keys (AGMK). The ad-hoc user-key identifier (AGUK-ID) is stored in a CSB-ID field of the MIKEY I_MESSAGE.

In an implementation, following Table 1 depicts a new Purpose Tag 7 for denoting AGMK (Adhoc Group Management Key) for encryption of Adhoc group communication in MCX.

TABLE 1

| Purpose tag (4-bit) | Key type | Key usage | Application of key diversity through UK-ID |
|---|---|---|---|
| 0 | GMK | Protection of group communications. | Yes |
| 1 | PCK | Protection of Private Call communications. | No |

TABLE 1-continued

| Purpose tag (4-bit) | Key type | Key usage | Application of key diversity through UK-ID |
|---|---|---|---|
| 2 | CSK | Protection of application signalling (XML and SRTCP) between the MC client and MC domain. | No |
| 3 | SPK | Protection of application signalling (XML and SRTCP) between servers in MC domain(s). | No |
| 4 | MKFC | Used as defined in Annex H. | No |
| 5 | MSCCK | Used as defined in Annex H. | No |
| 6 | MuSiK | Protection of multicast signalling between the MCX Server and the MC Client. | No |
| 7 | AGMK | Protection of Adhoc Group communications. | Yes |
| 8-15 | Not defined | | |

FIG. 2B depicts another method of adhoc-communication in Mission Critical Systems (MCX). The method comprises generating (step 208) a master-key (AGMK) designated for ad-hoc communication by a first UE. Thereafter, a first ad-hoc communication invitation-message signed by the first UE is transmitted (step 210) to an application server (AS). The first message comprises a main payload comprising an encapsulated key defined by encryption of the ad hoc master-key (AGMK) by a user-identity (UID) related to the application server (AS).

Thereafter, a second ad-hoc communication invitation-message signed by the application server (AS) is transmitted (step 212) to a second UE. The second message is based on the first message and comprises a payload based on an encapsulated key defined by encryption of the ad hoc master-key (AGMK) by a user-identity (UID) related to the second UE.

The adhoc-communication is established between the first user equipment (UE1) and the second user equipment (UE2) based on the second message. In an implementation, the first and second transmission message comprising the payloads is the MIKEY-SAKKE I_MESSAGE defined in IETF RFC 6509.

FIG. 2C depicts another method of ad-hoc communication in Mission Critical Systems (MCX). The method comprises generating (step 214) a master-key (AGMK) for ad-hoc communication by an application server (AS) based on a trigger received from a first UE.

Further, the method comprises creating (step 216) a first ad-hoc communication invitation-message signed by the server (AS) for transmitting the master key (AGMK) to the first UE. The first ad-hoc communication message comprises a main payload defined by an encapsulated key that in turn is defined by encryption of the ad-hoc master-key (AGMK) by a user-identity (UID) related to the first UE.

Further, the method comprises creating (step 218) the second ad-hoc communication invitation-message signed by the application server (AS) for transmitting the master key (AGMK) to a second UE. The second message comprises a main payload comprising an encapsulated key that in turn is defined by encryption of the ad-hoc master-key (AGMK) by a user-identity (UID) related to the second UE. The first and the second transmission message comprising the payloads is a MIKEY-SAKKE I_MESSAGE defined in IETF RFC 6509. Accordingly, a secure adhoc-communication is achieved among the UEs based on the first and the second message.

Figure 3:
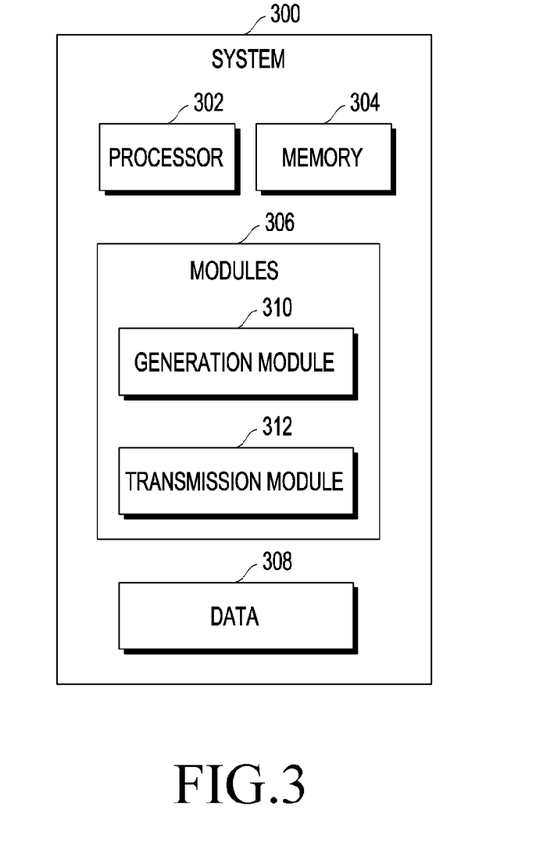
FIG. 3 illustrates a system, in accordance with another embodiment of the invention at least as depicted in FIG. 2.

FIG. 3 illustrates a system 300 for secure adhoc communication in Mission Critical Services (MCS), according to an embodiment of the present disclosure. In an implementation, the modules 306 within the system 300 may include a generation module 310 or a key-generator module for executing the steps 202, 204, 208 and 214 and a transmission module 312 for executing the steps 206, 210, 212, 216 and 218. The generation module 310 and the transmission module 312 are in communication with each other. The data 308 serves, amongst other things, as a repository for storing data processed, received, and generated by one or more of the modules 306.

The system 300 may correspond to group management server (GMS) for key-management in Mission Critical Systems (MCX) between an initiating party and a receiving party, a UE operating within the MCX systems or within the an application server (AS) operating in a Mission Critical Systems (MCX) for ad hoc communication.

In an embodiment, the system 300 may generate a GMK ID which may be understood as a key ID having a purpose tag of 7 being indicative of a type of key. In the present embodiment, the GMK ID may be indicative of an Adhoc key. In an embodiment, the system 300 may also generate a temporary ID indicative of Adhoc Uniform Resource Identifier (URI).

Whenever UE makes an Adhoc call, it uses the AGMK for SRTP and the Terminating UE automatically uses AGMK for SRTP.

The memory 304 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules 306, amongst other things, include routines, programs, objects, components, and data structures, which perform particular tasks or implement data types. The modules 306 may also be implemented as, signal processor(s), state machine(s), logic circuitries, and/or any other device or component that manipulate signals based on operational instructions.

Further, the modules 306 can be implemented in hardware, instructions executed by a processing unit, or by a combination thereof. The processing unit can comprise a computer, a processor, such as the processor 302, a state machine, a logic array or any other suitable devices capable of processing instructions. The processing unit can be a general-purpose processor which executes instructions to cause the general-purpose processor to perform the required tasks or, the processing unit can be dedicated to perform the required functions. In another aspect of the present disclosure, the modules 306 may be machine-readable instructions (software) which, when executed by a processor/processing unit, perform any of the described functionalities.

Figure 4:
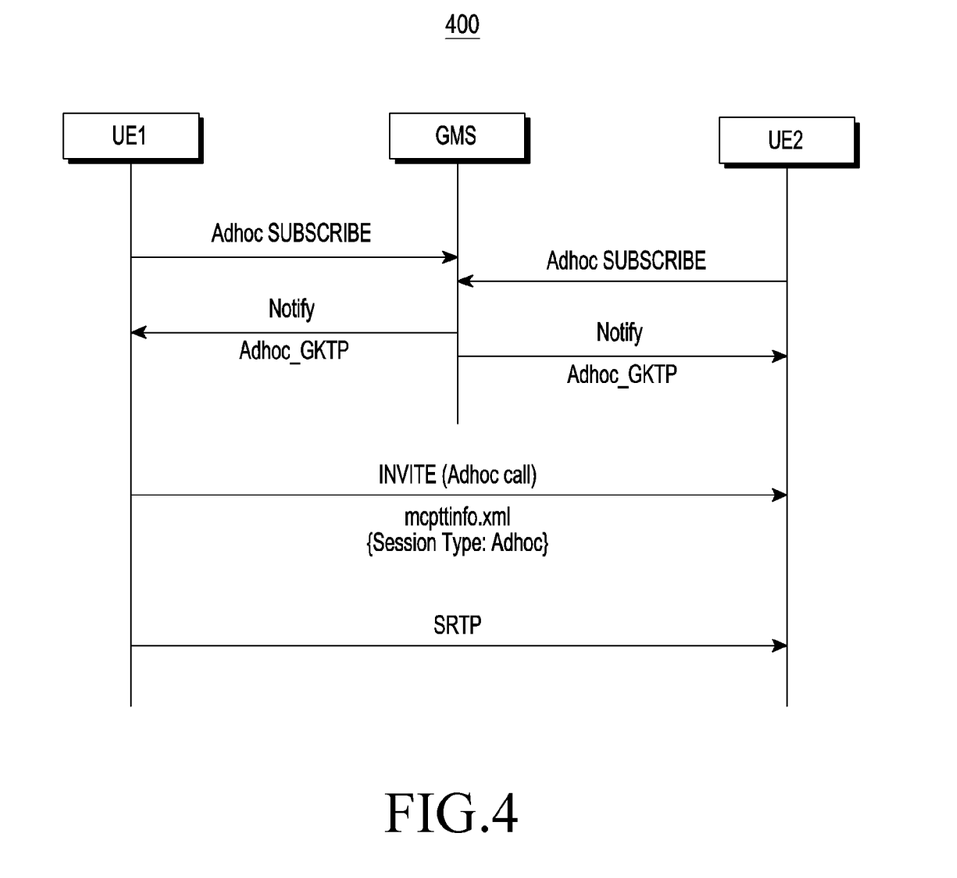
FIG. 4 illustrates an example networking environment depicting an example implementation of method steps of FIG. 2A, in accordance with the embodiment of the invention.

FIG. 4 illustrates an example networking environment 400 depicting an example implementation of method steps of FIG. 2A. Referring to FIG. 2 and FIG. 3, in an embodiment, the generation module 310 of the GMS may generate an Adhoc Group Management Key (AGMK). In an embodiment, the generation module 310 may also generate Group Key Transport Payloads (GKTP). The transmission module 312 may then transmit the AGMK along with the GKTPs to a user of the adhoc call. In an embodiment, the transmission module 312 may transmit the AGMK along with the GKTPs in a Group Management Server (GMS) NOTIFY format as an I_MESSAGE.

Thereafter, when a first User Equipment (UE) initiates the adhoc call, the first UE may use the AGMK for securing the adhoc call by using Secure Real-Time Transport Protocol (SRTP). Similarly, a second UE receiving the adhoc call may also use the AGMK for the SRTP. In an embodiment, all adhoc calls within a domain may be encrypted using the same one or more keys.

Figure 5:
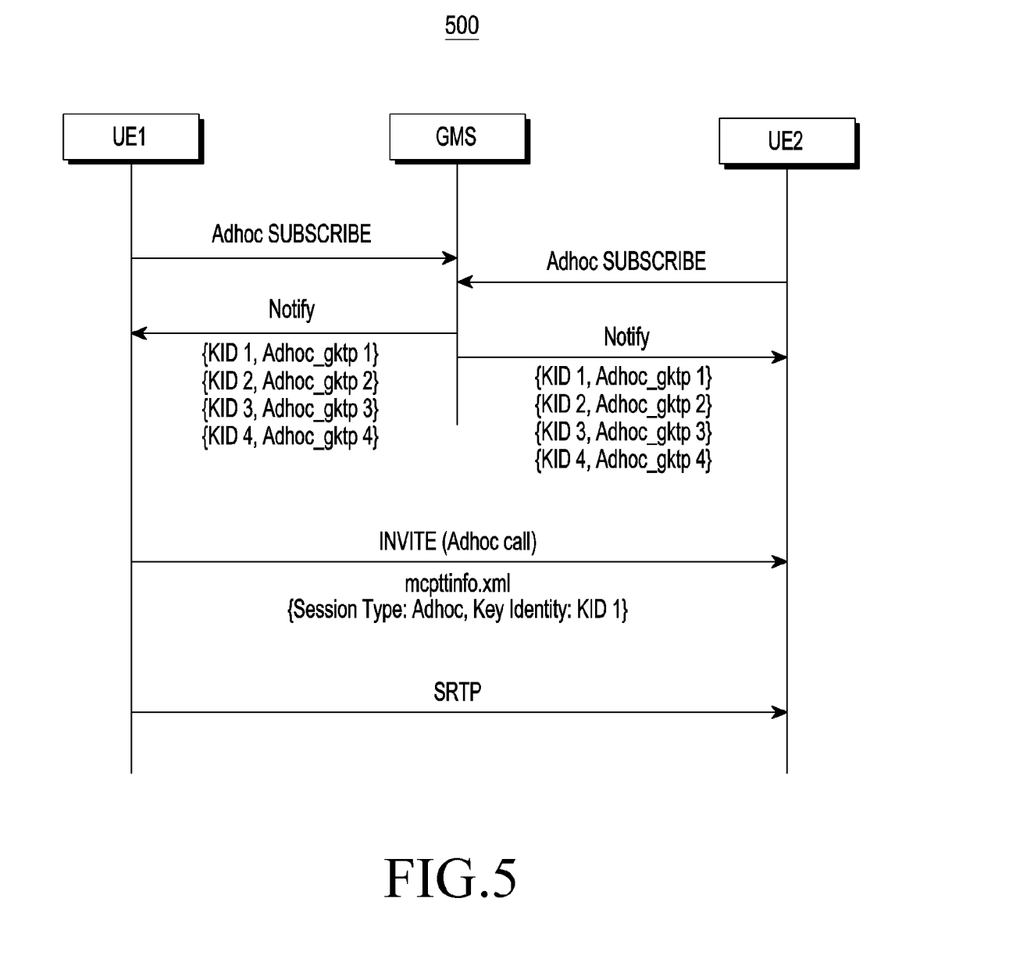
FIG. 5 illustrates an example implementation of method steps of FIG. 2A, in accordance with the embodiment of the invention.

FIG. 5 illustrates another example implementation of method steps of FIG. 2A, in accordance with the embodiment of the invention. In the implementation depicted in FIG. 4, the system 300 may generate one reserved key, i.e., one AGMK for all users in a domain for establishing the adhoc call. In the present implementation, for further improving the security of the communication, the system 300 may generate 10 such reserved keys. Each of the reserved keys may have a unique set of Key-Identity {KID, (AGMK-ID, AGMK)} to be transmitted in GMS SIP NOTIFY. In such an embodiment, the user may select one of the reserved keys for establishing the adhoc call. When initiating the adhoc call, the first UE may add the Key-Identity (KID) for the selected key for SRTP. In an embodiment, the first UE may add the KID in a mcptt-info.xml format. Further, the second UE may use the same AGMK that matches the AGMK-ID in the mcptt-info.xml format.

Whenever UE makes an Adhoc call, it uses the AGMK for SRTP and the Terminating UE automatically uses AGMK for SRTP. In an example, all the Adhoc calls within the domain may be encrypted using different (AGMK, AGMK-ID) as identified by different KID.

In an implementation, for enhanced security, thereby may be 10 reserved-keys with different {KID, (AGMK-ID, AGMK)} pairs to be sent in GMS-NOTIFY. While initiating an Adhoc call, the UE adds the KID for the key proposed to be used for SRTP in the mcptt-info. xml. Terminated users will use the same AGMK that matches the KID in the mcptt info xml.

In an implementation, the implementation of FIG. 4 and FIG. 5 show Adhoc calls with Users in the same domain. However, the implementation may be extendable across various partner systems or partner access networks. In an example, while "mcx-info.xml" indicates session-type as "Adhoc" and Key-Identity as "KID", "mcx" stands for mcptt, mcdata, mcvideo.

Figure 6:
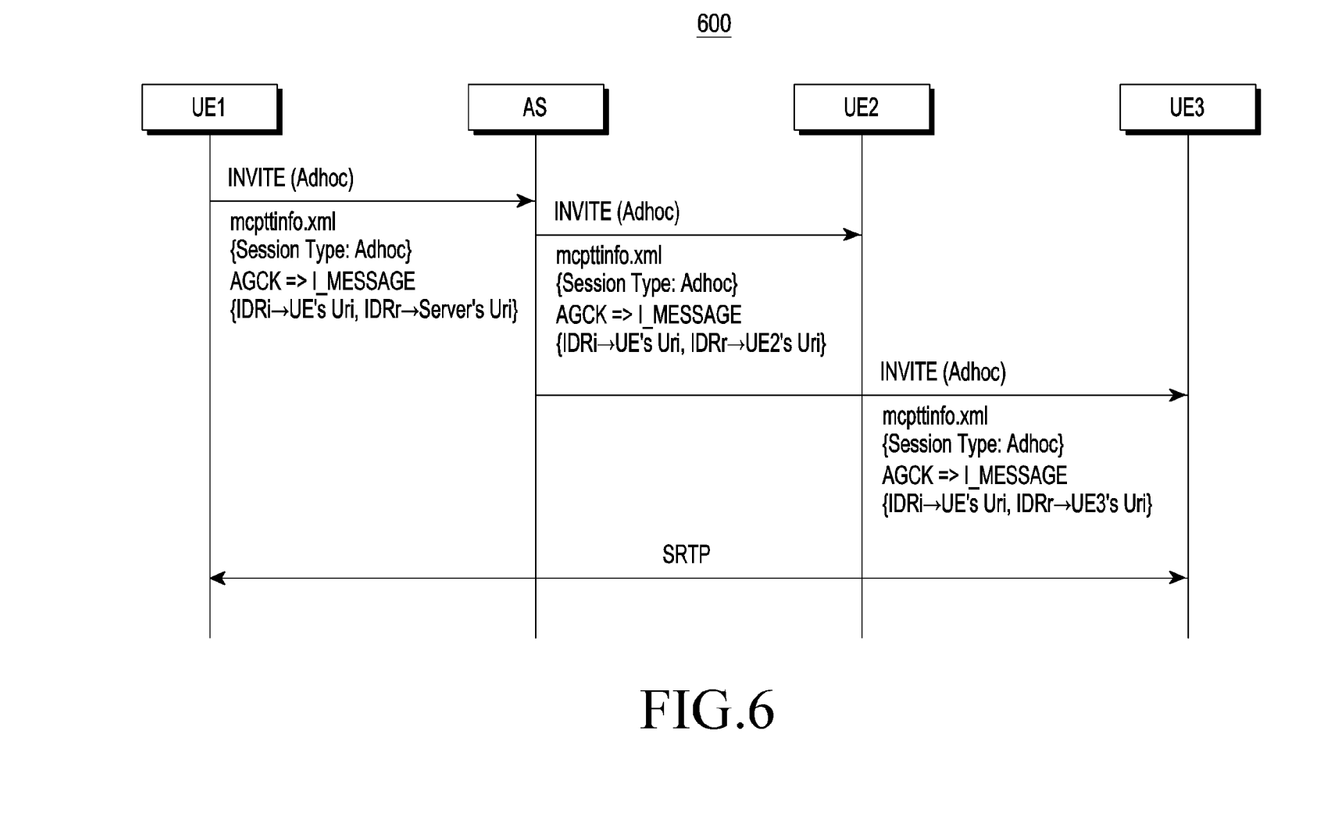
FIG. 6 illustrates an example implementation of method steps of FIG. 2B, in accordance with the embodiment of the invention.

FIG. 6 illustrates an example implementation of method steps of FIG. 2B, in accordance with the embodiment of the invention. For the sake of brevity, features of the present disclosure that are already explained in detail in the description of FIG. 3, FIG. 4 and FIG. 5 are not explained in the description of FIG. 4.

The call flow diagram 600 depicts the adhoc-call between users within the same domain. In an embodiment, the call flow diagram 600 is applicable in case of calls being established across domains as well, without departing from the scope of the present disclosure. Further, in the embodiment with multiple reserved keys, a mcptt-info.xml extension is required. In an embodiment, the mcptt-info.xml extension may not be required in case of generation of a single reserved key. Furthermore, the call flow diagram 600 is equally applicable to MCPTT adhoc voice calls, MCData adhoc calls and MCVideo adhoc calls as well, without departing from the scope of the present disclosure.

In the present implementation, the UE creates the key (AGCK) for Adhoc call in real time during the operation on the fly. Unlike the implementation of FIG. 4 and FIG. 5, the GMS does not generate the master key for ad hoc communication. Akin to PCK in Private call, the UE generates AGCK (Adhoc Group Call Key) and encrypts it using Application server's UID. The Application server (AS) distributes the AGCK key to other members (UEs) in that Adhoc call by encrypting it with the respective terminating UIDs (UE1, UE2, UE3). Unlike the implementation of FIG. 4 and FIG. 5, the present implementation sends the AGCK and adhoc communication invitation together as a part of same communication.

Unlike the implementation of FIG. 4 and FIG. 5, the present implementation sends the AGCK and adhoc communication invitation together as a part of same communication.

Figure 7:
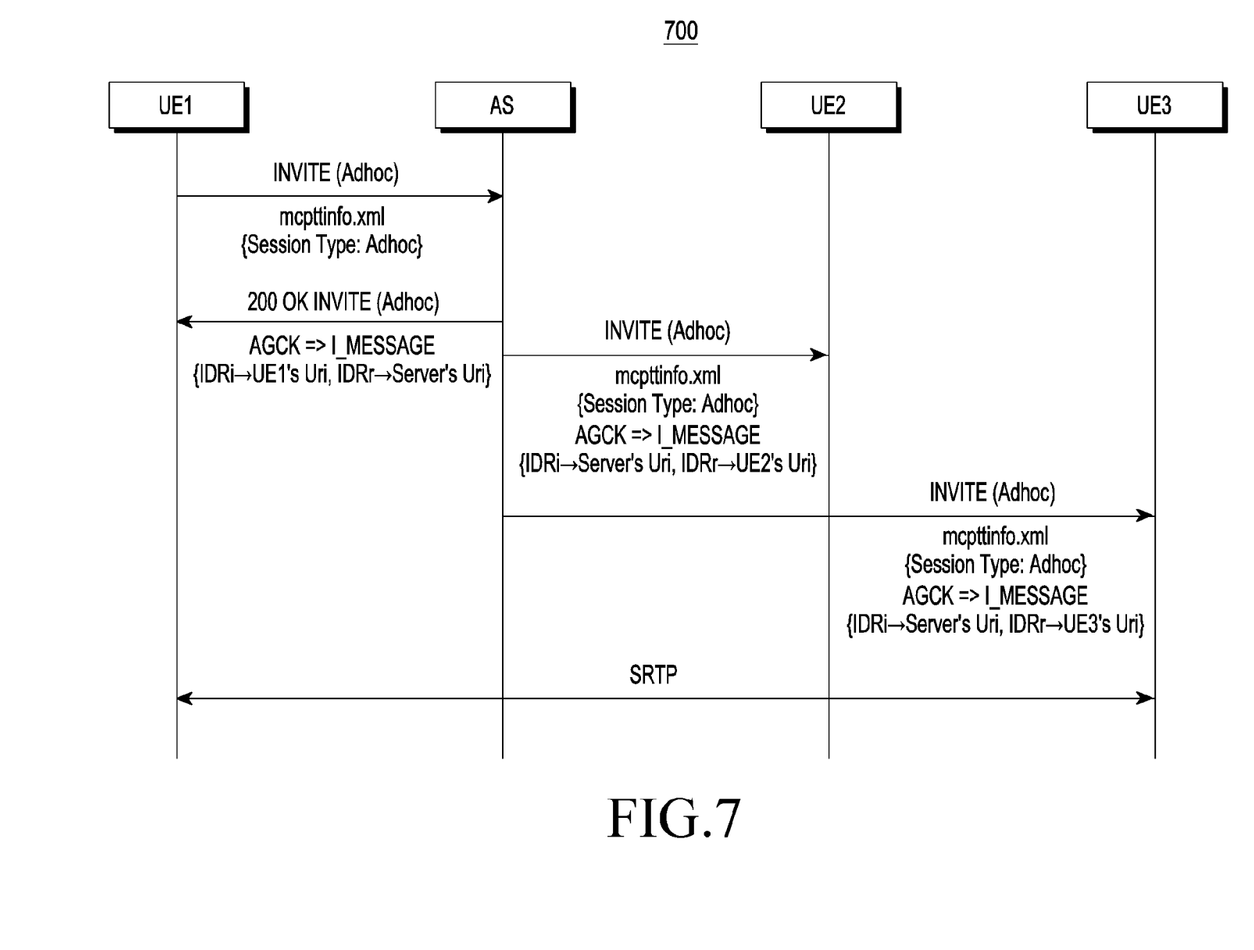
FIG. 7 illustrates an example implementation of method-steps of FIG. 2C, in accordance with the embodiment of the invention.

FIG. 7 illustrates an example implementation of method-steps of FIG. 2C, in accordance with the embodiment of the invention. In the present environment 700, the server (AS) generates the AGCK (Adhoc Group Call Key) for all-users (UE1, UE2, UE3) and shares them in the INVITE for the terminating Adhoc group participants. For the initiator, the AGCK is shared in 200 OK of INVITE. The Server (AS) has the flexibility to create the AGCK for each call. Overall, the application server's (AS) operation may be optimized operation Optimization on creating AGCK can be applied in server side which is an added advantage in this method.

Unlike the implementation of FIG. 4 and FIG. 5, the present implementation sends the AGCK and adhoc communication invitation together as a part of same communication.

As would be gathered, the systems and methods as offered by the present disclosure allow for establishment of adhoc communication in the MCS. The present disclosure allows secure sharing of keys for establishment of the adhoc calls. In an embodiment, a single key may be provided to the user. In another embodiment, multiple keys may be offered to the user and the user may select one of the keys for establishing the adhoc call.

In yet another embodiment, the present subject matter allows generation of the group call announcement message for sharing the master key with the participants of the call. The keys are used for SRTP encryption of the communication. Therefore, a secure adhoc communication is ensured.

The present subject matter at least addresses a current necessity of secured Adhoc Group calls in MCX. Keys for Adhoc group communication may be shared in a secure way and users will have flexibility in choosing a key amongst the received ones at least as per the implementation of FIGS. 4 and 5.

Further, at least as per the embodiment as depicted in FIG. 6 & FIG. 7, the Adhoc group communication behaves similar to a private call where Client or server can create Adhoc Group keys in real-time only when required. Overall, the key-sharing in FIG. 6 and FIG. 7 takes places alongside sending the invitation of ad-hoc communication, i.e. in real-time or on the fly.

The present subject matter at least facilitates mobile network operators (MNO) in achieving MCX based Adhoc group calls. The calls in MCX are secured (SRTP encrypted) by using AGMK (Adhoc Group Management Key) or AGCK (Adhoc Group Cal Key).

The present subject matter address the shortfall, i.e. current MCX specifications not mentioning encryption mechanism for Adhoc group calls and not facilitating sharing of keys to support SRTP in Adhoc calls. Although MCX have adopted Mikey Sakke messaging to securely transfer keys to be used in SRTP for group calls, the same at least fails to realize the same for Adhoc calls. The present subject matter at least enables a mechanism by which security keys can be shared and used effectively for Adhoc calls as well.

The present subject matter may be construed to encompass various MCX services like MCPTT, MCVideo and MCData Adhoc group calls. Further, while the aforesaid description depicts only SRTP based secure ad-hoc on network communication, the proposed secured ad hoc communication mechanisms may also be understood as applicable for other media types like MSRP (Data Protocol used for File transfers/chat messages) in MCData service or any other media types used in ad-hoc communications implementing through the present subject matter. These mechanisms can be employed in other areas like VoLTE/RCS ad-hoc communications or off-network MCX ad-hoc communications, if secure communications are desired.

Figure 8:
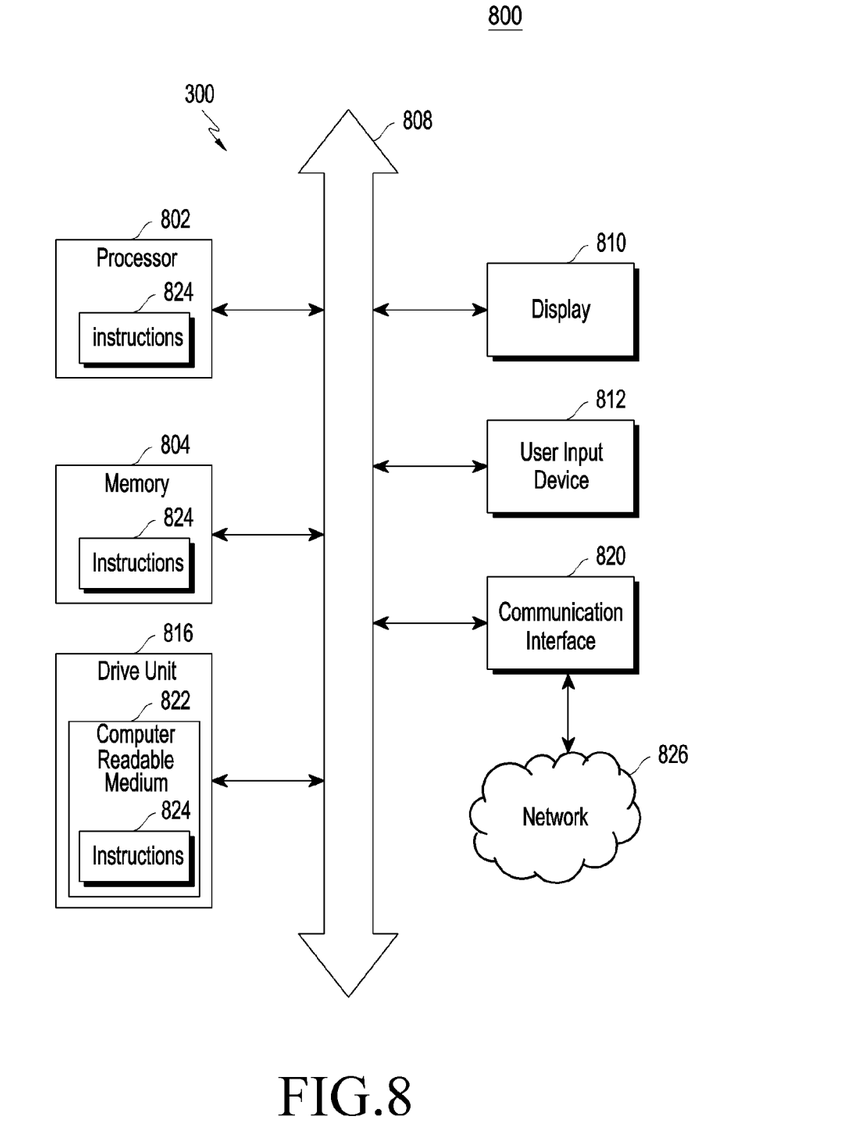
FIG. 8 shows an example computing-device based implementation of the system as depicted in FIG. 3, in accordance with the embodiment of the present subject matter.

FIG. 8 shows yet another exemplary implementation in accordance with the embodiment of the invention, and yet another typical hardware configuration of the system 300 in the form of a computer-system 800. The computer system 800 can include a set of instructions that can be executed to cause the computer system 800 to perform any one or more of the methods disclosed. The computer system 800 may operate as a standalone-device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802 e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analysing and processing data. The processor 802 may implement a software program, such as code generated manually (i.e., programmed).

The computer system 800 may include a memory 804, such as a memory 804 that can communicate via a bus 808. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 804 includes a cache or random access memory for the processor 802. In alternative examples, the memory 804 is separate from the processor 802, such as a cache memory of a processor, the system memory, or other memory. The memory 804 may be an external storage device or database for storing data. The memory 804 is operable to store instructions executable by the processor 802. The functions, acts or tasks illustrated in the FIGs. or described may be performed by the programmed processor 802 for executing the instructions stored in the memory 804. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 800 may or may not further include a display unit 810, such as a liquid crystal display (LCD), an organic light emitting diode (OLED), a flat panel display, a solid state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 816.

Additionally, the computer system 800 may include an input device 812 configured to allow a user to interact with any of the components of system 800. The computer system 800 may also include a disk or optical drive unit 816. The disk drive unit 816 may include a computer-readable medium 822 in which one or more sets of instructions 824, e.g. software, can be embedded. Further, the instructions 824 may embody one or more of the methods or logic as described. In a particular example, the instructions 824 may reside completely, or at least partially, within the memory 804 or within the processor 802 during execution by the computer system 800.

The present invention contemplates a computer-readable medium that includes instructions 824 or receives and executes instructions 824 responsive to a propagated signal so that a device connected to a network 826 can communicate voice, video, audio, images or any other data over the network 826. Further, the instructions 824 may be transmitted or received over the network 826 via a communication port or interface 820 or using a bus 808. The communication port or interface 820 may be a part of the processor 802 or may be a separate component. The communication port 820 may be created in software or may be a physical connection in hardware. The communication port 820 may be configured to connect with a network 826, external media, the display 810, or any other components in system 800, or combinations thereof. The connection with the network 826 may be a physical connection, such as a wired Ethernet connection or may be established wirelessly as discussed later. Likewise, the additional connections with other components of the system 800 may be physical connections or may be established wirelessly. The network 826 may alternatively be directly connected to the bus 808.

The network 826 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A method of key-management by a group management server in Mission Critical Systems (MCX) between an initiating party and a receiving party, the method comprising:
   generating a master key, the master key being designated for an ad-hoc communication;
   allocating an identifier to the generated master key; and
   transmitting a transmission message signed by an initiating MCX entity including the master key to a receiving MCX entity.

2. The method of claim 1, wherein the transmission message comprises:
   a main payload defined by an encapsulated key defined by encryption of the master key by a user-identity related to the receiving MCX entity; and
   an ad-hoc user-key identifier defining an end-point-specific key identity derived from the allocated identifier; and
   wherein an ad-hoc communication invitation is transmitted from a first user equipment to a second user equipment based on:
   the master key; or
   a key identifier identifying the master key from amongst a plurality of master keys.

3. The method of claim 2, wherein each of the allocated identifier and the ad-hoc user-key identifier of the master key is a 32-bit key identifier representing the generated master key for the ad-hoc communication and comprises:
- a 4 bit purpose-tag; and
- a 28 bit random number.

4. The method of claim 2, wherein the transmission message is a MIKEY-SAKKE I_MESSAGE defined in IETF RFC 6509.

5. The method of claim 4, wherein the ad-hoc user-key identifier is stored in a CSB-ID field of the MIKEY I_MESSAGE.

6. A group management server for key-management in Mission Critical Systems (MCX) between an initiating party and a receiving party, the group management server comprising:
- a processor; and
- a memory storing instructions, wherein the instructions, when executed by the processor, cause the processor to:
   - generate a master key, the master key being designated for an ad-hoc communication;
   - allocate an identifier to the generated master key; and
   - transmit a transmission message signed by an initiating MCX entity including the master key to a receiving MCX entity.

7. The group management server of claim 6, wherein the transmission message comprises:
- a main payload defined by an encapsulated key defined by encryption of the master key by a user-identity related to the receiving MCX entity; and
- an ad-hoc user-key identifier defining an end-point-specific key identity derived from the allocated identifier; and wherein an ad-hoc communication invitation is transmitted from a first user equipment to a second user equipment based on:
- the master key; or
- a key identifier identifying the master key from amongst a plurality of master keys.

8. The group management server of claim 7, wherein each of the allocated identifier and the ad-hoc user-key identifier of the master key is a 32-bit key identifier representing the generated master key for the ad-hoc communication and comprises:
- a 4 bit purpose-tag; and
- a 28 bit random number.

9. The group management server of claim 7, wherein the transmission message is a MIKEY-SAKKE I_MESSAGE defined in IETF RFC 6509.

10. The group management server of claim 9, wherein the ad-hoc user-key identifier is stored in a CSB-ID field of the MIKEY I_MESSAGE.

\* \* \* \* \*